United States Patent Office 3,483,271
Patented Dec. 9, 1969

3,483,271
POLYPHENYLENE ETHERS STABILIZED WITH COMBINATIONS OF NITROGEN-CONTAINING STABILIZERS
Klaus E. Holoch, David F. Raynor, and William R. Haaf, Pittsfield, Mass., assignors to General Electric Company, a corporation of New York
No Drawing. Filed Jan. 27, 1967, Ser. No. 612,086
Int. Cl. C08g 51/60
U.S. Cl. 260—874       7 Claims

ABSTRACT OF THE DISCLOSURE

A stabilized polyphenylene ether composition consisting of a major portion of a polyphenylene ether and a minor portion of a stabilizer consisting of a hexaalkylphosphoric triamide, a trialkanolamine borate and a hydrazine.

---

This invention relates to polyphenylene ether plastics, and more particularly, to the stabilization of such plastics with a stabilizer consisting of a hexaalkylphosphoric triamide, a trialkanolamine borate and a hydrazine.

It is known that the polyphenylene ethers, and particularly, the 2,6-dialkyl substituted polyphenylene ethers, are somewhat unstable under the influence of heat and light exposure, causing the resin to become dark colored, brittle, and undesirable for many uses. The causes of the degradation is not fully understood, but is believed to be due, in part, to the presence of hydroxyl groups on the polymer chain, a sensitivity to oxygen containing atmospheres, and the degradative effects of traces of impurities present in the resin composition.

The term "polyphenylene ether" includes those polymers disclosed and claimed in U.S. Patents Nos. 3,306,874 and 3,306,875, the polymers disclosed and claimed in U.S. patents, Nos. 3,257,357 and 3,257,358 of Gelu Stoeff Stamatoff (all incorporated herein by reference), and the various copolymers and blends of the polyphenylene ethers formed by copolymerizing or blending the polyphenylene ethers with other monomers or polymers such as the polyolefins, polystyrenes, polycarbonates, and the like, wherein the polyphenylene ether is present in an amount sufficient to significantly effect the properties of the polymer composition due to the influence of heat and light.

Heretofore, a large number of different compounds such as the phenolic antioxidants exemplified by p-phenylphenol, N-steroyl-p-aminophenol, and 2,2'-methylene-bis (4-ethyl-6-tert.butylphenol) have been used as heat and light stabilizers for the polyphenylene ether compositions. These stabilizers have been generally found to be unsatisfactory for even short exposures to heat or light. Other stabilizers such as the ketenes, benzoic anhydride and the mercaptobenzimidazoles have also been tried and found to be effective for short periods of exposure, but not for the relatively long exposures required for many commercial applications.

In co-pending U.S. patent application, Ser. No. 610,134, now U.S. Patent No. 3,420,792, it is disclosed that the addition of a small amount of a hexaalkylphosphoric triamide is a very effective stabilizer for the polyphenylene ethers when added in an amount ranging between about 0.01 and about 10% by weight, calculated on the polymer.

The hexaalkylphosphoric triamides may be represented by the following general formula:

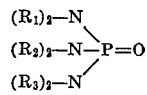

wherein $R_1$, $R_2$ and $R_3$ represent alkyl groups of from 1–6 carbon atoms.

It has now been found that a stabilizer combination of a hexaalkylphosphoric triamide, a trialkanolamine borate, and optionally, a hydrazine, added to a polyphenylene ether results in a polymer having a much greater stability to heat and light as exemplified by a time to embrittlement increase of at least 150% as compared to a polyphenylene ether containing only the hexaalkylphosphoric triamide.

The trialkanolamine borates used in the stabilizer composition of this invention may be represented by the following general formula:

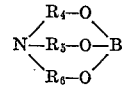

herein $R_4$, $R_5$ and $R_6$ represent divalent saturated aliphatic hydrocarbon radicals having from 1–6 carbon atoms.

The hydrazine, which may be used in the stabilizer composition of the invention, may be represented by the following general formula:

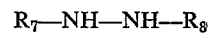

wherein $R_7$ is a monovalent acyl radical of a carboxylic acid and $R_8$ is a monocyclic aryl radical.

Typical examples of hydrazines corresponding to the general formula noted above are, for example, benzoylphenyl hydrazine, acetylphenyl hydrazine, propanoylphenyl hydrazine, butoylphenyl hydrazine, etc.

The amount of stabilizer added to the polyphenylene ether depends upon the activity of the stabilizer, the quality of the polymer to be stabilized and the conditions to which the polymer is to be exposed. The stabilizer may be added in an amount of between about 0.1 and 10.0% by weight, calculated on the polymer, and preferably in an amount of between 1.0 and 6.0% by weight calculated on the polymer. In general, the hexaalkylphosphoric triamide portion of the stabilizer composition should be at least equal to the remainder of the composition, and preferably, should be equal to twice the remainder of the composition.

In a preferred embodiment of this invention, the stabilizer composition is composed of 1–3 parts by weight hexaalkylphosphoric triamide, 0.5 to 1.5 parts by weight trialkanolamine borate and 0 to 1.0 part by weight hydrazine.

The manner of adding the stabilizer to the polyphenylene ether is not critical to this invention. Hence, any convenient method can be employed. For example, the stabilizer can be blended with resin powder in a blender, such as a Waring blender. Alternatively, the resin can be dissolved in a suitable solvent and the stabilizer added to the solution. The stabilized polymer may then be recovered from solution.

The stabilized compositions of this invention are useful for all purposes for which the polyphenylene ethers have hitherto been used, for example, for conversion to films, fibers, molded articles and the like by conventional methods.

The following examples serve to illustrate the invention, but they are not intended to limit it thereto, the parts being by weight unless otherwise stated.

Example 1

This example illustrates the method for forming samples of a polyphenylene ether containing a desired quantity of a stabilizer for evaluation.

The polymer, in powder form, and a desired quantity of stabilizer, are mixed together in Waring blender. The resulting mixture is extruded at a temperature varying between about 500 and 600° F. and the extruded strands so formed are chopped into pellets. Two gram samples of the pellets are pressed into films by preheating the pellets at a temperature of 550° F. for one minute and thereafter pressing at a temperature of 550° F. and a pressure of 20,000 p.s.i. for one minute. The resulting films are about 10 mils thick. They are allowed to cool and cut into strips measuring approximately 0.5 by 4.0 inches. The stabilizers are evaluated by subjecting the film samples to heat aging in an air circulating oven maintained at an elevated temperature and determining the time to embrittle. This is determined by folding the film sample at various times during the heat aging period until a film strip embrittles to a point where it snaps when partially folded.

Examples 2–8

The following examples illustrate the effect of various stabilizers on a poly-(2,6-dimethyl-1,4-phenylene) ether heat aged at 175° C. Table I illustrates stabilizer compositions and time to embrittle.

TABLE I

| Example number | Stabilizer composition | Time to Embrittle (hours) |
|---|---|---|
| 2 | Control (no additive) | 30 |
| 3 | 1.0% hexamethylphosphoric triamide | 60 |
| 4 | 1.0% triethanolamine borate | 32 |
| 5 | 1.0% triisopropanolamine borate | 28 |
| 6 | 1.0% hexamethylphosphoric triamide, 1.0% triethanolamine borate. | 140 |
| 7 | 1.0% hexamethylphosphoric triamide, 1.0% triisopropanolamine borate. | 115 |
| 8 | 1.0% hexamethylphosphoric triamide, 1.% triethanolamine borate, 1.0% acetylphenylhydrazine. | 240 |

Examples 9–15

The following examples illustrate the effect of the stabilizers of this invention on a polymer composition consisting of a poly-(2,6-dimethyl-1,4-phenylene) ether containing 17% polystyrene, heat aged at temperatures of 105° C., 115° C., 125° C. and 150° C. Table II below indicates stabilizer compositions and time to embrittle.

TABLE II

| Example Number | Stabilizer Composition | Time to Embrittle (hrs.) | | | |
|---|---|---|---|---|---|
| | | 105° C. | 115° C. | 125° C. | 150° C. |
| 9 | Control (no additive) | 200 | 65 | 35 | |
| 10 | 1.0% hexamethylphosphoric triamide | 320 | 110 | 80 | 45 |
| 11 | 1.0% triethanolamine borate | 190 | 70 | 32 | 20 |
| 12 | 1.0% hexamethylphosphoric triamide, 1.0% triethanolamine borate. | 560 | 235 | 210 | 150 |
| 13 | 0.5% hexamethylphosphoric triamide, 0.5% triethanolamine borate, 0.5% acetylphenyl hydrazine. | 2,175 | 1,575 | 670 | |
| 14 | 1.0% hexamethylphosphoric triamide, 1.0% triethanolamine borate, 1.0% acetylphenyl hydrazine. | | 1,580 | 850 | |
| 15 | 1.0% hexamethylphosphoric triamide, 1.0% triisopropanolamine borate 1.0% acetylphenyl hydrazine. | 1,500 | 1,250 | 725 | |

The polyphenylene ethers are non-dripping and self extinguishing, and meet the requirements set forth by the Underwriters' Laboratory, Bulletin Number 94. However, these desirable properties are lost, to some extent, when the polymer contains groups that are not self extinguishing. As an unexpected advantage of this invention, it has been found that the addition of hexalkylphosphoric triamide alone, or in combination with a trialkanolamine borate as defined above, greatly increases the self extinguishing properties of the polymer as exemplified by the following examples.

Example 16

A blend was prepared having the following formula for:

| | Lbs. |
|---|---|
| Poly-(2,6-dimethyl-1,4-phenylene)-oxide | 50 |
| Polystyrene | 50 |
| Hexamethylphosphoric triamide | 1.5 |

The mixture was extruded at a temperature of approximately 550° F. and the extruded strands chopped into pellets. The pellets were then molded into flame bars measuring 5″ by ½″ with a thickness of 1/16″ in a manner set forth in U.L. Bulletin No. 94. The self extinguishing properties were determined by igniting the flame bar by placing it in a blue flame for 10 seconds, removing the flame, and noting the time for the ignited bar to extinguish itself. Five flame bars were tested in this manner. The average self extinguishing time for the five bars was 14 seconds. No dripping of the flaming bars was observed.

Example 17

The procedure of Example 16 was repeated, but 0.5 lb. of triethanolamine borate was added to the formulation. The average self extinguishing time for five test bars was measured at 10.7 seconds. Again, the flame bars were non-dripping.

It should be understood that the invention is susceptible to further modification within the scope of the appended claims.

What we claim as new and desire to secure by Letters Patent of the United States is:

1. A stabilized polyphenylene ether composition consisting of a major portion of a polyphenylene ether and a stabilizing quantity of a stabilizer consisting essentially of:

(1) a major portion of a hexalkylphosphoric triamide having the general formula

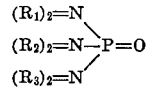

wherein $R_1$, $R_2$ and $R_3$ represent alkyl groups from 1–5 carbon atoms; and (2) a minor portion of:

(a) a trialkanolamine borate having the formula

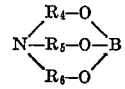

wherein $R_4$, $R_5$ and $R_6$ represent divalent saturated hydrocarbon radicals having from 1–6 carbon atoms; and (b) a hydrazine having the formula

wherein $R_6$ represents a monovalent acyl radical of a carboxylic acid and $R_8$ represents a monocyclic aryl radical.

2. The stabilized polyphenylene ether composition of claim 1 wherein the polyphenylene ether is poly-(2,6-dimethyl-1,4-phenylene) ether.

3. The stabilized polyphenylene ether composition of claim 1 wherein the polyphenylene ether is a mixture of a poly - (2,6-dimethyl-1,4-phenylene) ether and a polystyrene.

4. The stabilized polyphenylene ether composition of claim 1 wherein the stabilizer constitutes 0.1 to 10% by weight of the composition, calculated on the polymer.

5. The stabilized polyphenylene ether composition of claim 1 wherein the stabilizer constitutes from 1.0 to 6.0% by weight of the composition, calculated on the polymer.

6. The stabilized polyphenylene ether composition of claim 1 wherein the stabilizer consists essentially of from 1.0 to 3.0 parts hexamethylphosphoric triamide, from 0.5 to 1.5 parts triethanolamine borate and from 0 to 0.5 part acetylphenyl hydrazine, all by weight.

7. A stabilizer composition consisting essentially of:
(1) a major portion of a hexaalkylphosphoric triamide having the general formula:

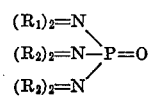

wherein $R_1$, $R_2$ and $R_3$ represent alkyl groups having from 1–6 carbon atoms; and (2) a minor portion of:
(a) a trialkanolamine borate having the formula:

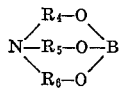

wherein $R_4$, $R_5$ and $R_6$ represent divalent saturated aliphatic hydrocarbon radicals having from 1–6 carbon atoms; and (b) a hydrazine having the formula

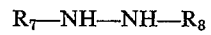

wherein $R_7$ represents a monovalent acyl radical of a carboxylic acid and $R_8$ represents a monocyclic aryl radical.

References Cited
UNITED STATES PATENTS

| | | | |
|---|---|---|---|
| 2,912,461 | 11/1959 | Donovan | 260—562 |
| 3,117,104 | 1/1964 | Bown et al. | 260—45.9 |
| 3,143,528 | 8/1964 | Finestone et al. | 260—78 |
| 3,379,875 | 4/1968 | Holoch | 260—45.8 |
| 3,383,354 | 5/1968 | Prinz | 260—45.85 |
| 3,388,095 | 6/1968 | Huntjens | 260—45.8 |

DONALD E. CZAJA, Primary Examiner

R. A. WHITE, Assistant Examiner

U.S. Cl. X.R.

252—400; 260—45.8, 45.9, 873